F. L. MORSE.
MULTIPLATE POWER CHAIN.
APPLICATION FILED APR. 25, 1911.
1,138,237.
Patented May 4, 1915.
2 SHEETS—SHEET 1.
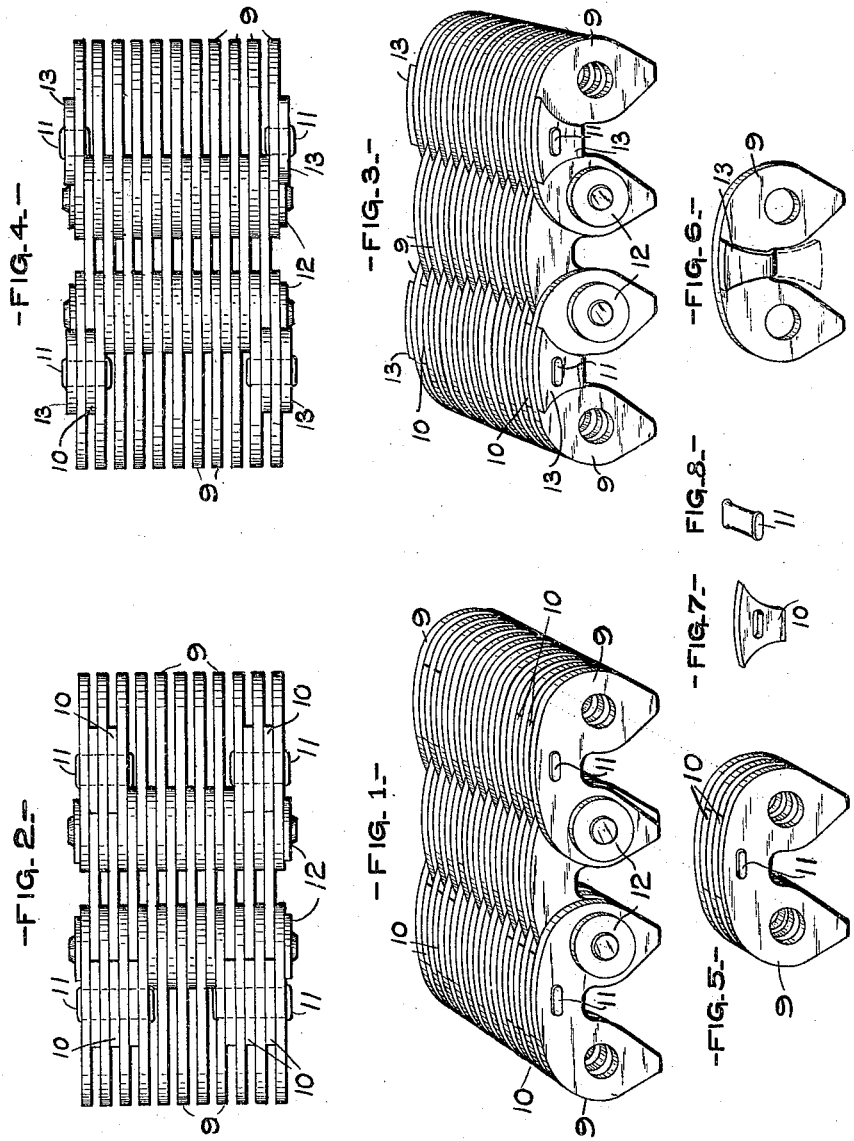
WITNESSES
INVENTOR
Frank L. Morse.
BY
Edward Wright.
ATTORNEY F. L. MORSE.
MULTIPLATE POWER CHAIN.
APPLICATION FILED APR. 25, 1911.
1,138,237.
Patented May 4, 1915.
2 SHEETS—SHEET 2.
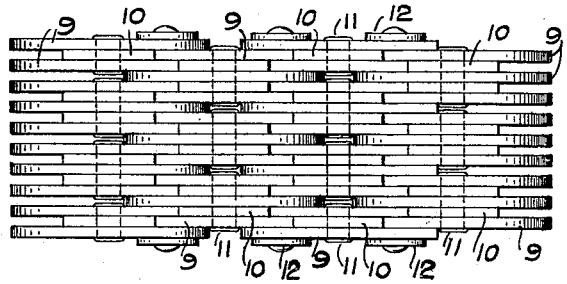
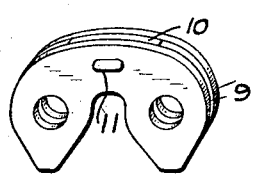
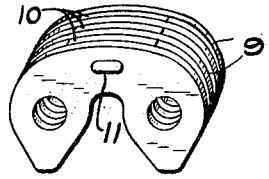
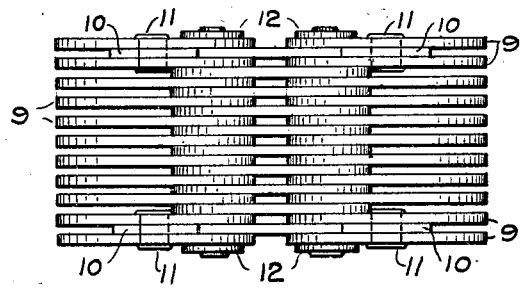
WITNESSES
INVENTOR
Frank L. Morse
BY
Edward Wright
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

MULTIPLATE POWER-CHAIN.

1,138,237.   Specification of Letters Patent.   Patented May 4, 1915.

Application filed April 25, 1911. Serial No. 623,278.

*To all whom it may concern:*

Be it known that I, FRANK L. MORSE, a citizen of the United States, residing at Ithaca, in the county of Tompkins and State of New York, have invented new and useful Improvements in Multiplate Power-Chains, of which the following is a specification.

This invention relates to power chains of the type wherein the links are composed of a plurality of interspersed plates adapted to arch over the teeth of the sprocket wheels, the links being connected together by pintles of various forms which pass through apertures in the plates forming the links and usually carry washers riveted upon the outside of the outside plates of the link.

As these chains are used in heavy power transmission and driven at high velocities, they are subject to severe strains due to rapid vibrations, and as the outside plates of the links are usually not as firmly supported as the more centrally located plates, they are more liable to work loose upon the pintles.

One of the objects of this invention is to overcome this difficulty by providing means for firmly securing together a plurality, two or three, or more, of the outside plates upon each side of a link.

Another feature of my improvement relates to drive chains adapted to be used upon flanged sprocket wheels, and consists in providing wear plates or guards projecting at the side of the chain upon the outside plates of the links for taking the wear and preventing the pintles and washers from rubbing upon the flanges of the sprocket wheels over which the chain passes.

Another object of my improvement is to strengthen the construction by riveting together certain plates of the links in sets, or sections, which are so arranged in adjacent links as to be interlocked and thereby tied together throughout the chain.

In the accompanying drawing, Figure 1 is a perspective view of three links of a chain, embodying certain features of my improvement; Fig. 2, a plan of same; Fig. 3, a perspective view, showing an additional feature of my improvement; Fig. 4, a plan view of same; Fig. 5, a perspective view of a section or set of three link plates riveted together; Fig. 6, a perspective view of an outside link plate showing an integral wear piece 13, folded over upon the outside of the plate; Figs. 7 and 8, perspective views of a spacing piece or wear plate, and a rivet, respectively; Fig. 9, a plan showing outside link plates riveted together, and also showing certain sections of adjacent links riveted and so arranged as to interlock and tie the plates of a section of links together; Fig. 10, a perspective view of a section of four plates riveted together; Fig. 11, a similar view of a section of two link plates; and, Fig. 12, a plan showing three links of a chain having two outside plates riveted together upon the opposite sides of alternate links.

According to the construction shown, the chain is formed of links built up of a series of plates, 9, which may be stamped out of sheet metal and shaped to arch over the teeth of the sprocket wheels. The plates of each link are preferably interspersed upon the pintles with the plates of the adjacent links, the pintles passing through apertures in the ends of the link plates and carrying washers 12, upon opposite ends outside of the outside link plates.

As the outside plates are thus less firmly supported than the others, I provide means such as spacing pieces, 10, and rivets, 11, for rigidly and securely fastening the outside plate at each side of the link with the next adjacent plate, as shown in Figs. 3, 4, 9, and 12, or with the next two or three adjacent plates, as indicated in Figs. 1 and 2. In this way the bearing of the outer plates is greatly strengthened and the useful life of the chain increased.

When the chain is designed to run on flanged sprockets additional pieces, 13, may be riveted upon the outside of the links to serve as wear plates, as shown in Figs. 3 and 4, to prevent injury to the washers and ends of the pintles. It will be apparent that these wear pieces or guards may be formed integral with the plate, if desired, and project from the side thereof, or may be stamped out and folded over upon the outside, as indicated in Fig. 6 of the drawing. In these cases, all friction and wear of parts will occur between the flanges and the wear pieces or guards 13, which affords a great protection to the washers, pintles and other parts of the chain.

In Fig. 9, I have shown a chain having alternate links with the outside plates and adjacent plates riveted together, and also having the other plates riveted together with spacing pieces in sections of three plates each, and so arranged that a section in one link overlaps two sections in the adjacent link whereby the sections are interlocked and tied together throughout the chain. This serves to strengthen the structure and forms a very durable drive chain.

Fig. 12 illustrates the simplest form of chain embodying my improvement for strengthening the outside plates which may be called a multiplate chain with a "selvage edge." In this case, the outside plates and the adjacent plate at each side of the alternate, or outside, links are riveted together with a spacing piece between them, thereby supporting each of the outside plates.

Any desired number of link plates may be riveted together to form the sections for building up a chain, four such plates with the interposed spacing pieces being indicated in Fig. 10, and these sections may be arranged in adjacent links to overlap in any suitable manner to give the desired result in tying the links together throughout the chain.

Having now described my invention, what I claim as new and desire to secure by Letters Patent, is:

1. A drive chain having links composed of a plurality of plates, the plates of one link being interspersed with the plates of the adjacent link, a spacing piece interposed between an outside link plate and the adjacent plate upon each side of the link, and independent means for rigidly securing said plates and spacer together upon opposite sides of the chain.

2. A drive chain having links composed of a plurality of plates, the plates of one link being interspersed with the plates of the adjacent link, and spacing pieces riveted between the outside plates and the adjacent plates upon opposite sides of the links, the plates upon opposite sides being riveted independently of each other.

3. A drive chain having links, each composed of a series of arch-shaped plates interspersed with the plates of adjacent links, spacing pieces interposed between the outside plates and adjacent plates upon both sides of the link, and separate means for rigidly securing said plates and spacing pieces together upon the opposite sides of the chain.

4. A drive chain having links, each composed of a series of arch-shaped plates interspersed with the plates of adjacent links, and spacing pieces securely riveted between the outside plates and adjacent plates upon both sides of the links, the plates upon one side being riveted independently of those upon the other side of the chain.

5. A drive chain having links, each composed of a series of arch-shaped plates interspersed with the plates of adjacent links, and spacing pieces securely riveted independently of each other between the arched portions of the outside plate and adjacent plate upon opposite sides of the link.

6. A drive chain having links composed of a plurality of plates, the plates of one link being interspersed with the plates of the adjacent link, and separate means for spacing apart and rigidly securing together the outside link plate and the adjacent plate upon opposite sides of a link.

7. A drive chain having links composed of a plurality of plates, the plates of one link being interspersed with the plates of the adjacent link, and the outside plate upon each side of alternate links being spaced apart from and riveted to the adjacent plate, the plates upon one side being riveted independently of those on the other side.

8. A drive chain having links composed of a plurality of plates, the plates of one link being interspersed with the plates of the adjacent link, a spacing piece interposed between the outside link plate and the adjacent plate, a wear plate upon the outside of the outside link plate, and a rivet securing said link plates, spacer and wear plate together.

9. A drive chain having links each composed of a plurality of separate sets of rigidly secured plates spaced apart and interspersed with plates of adjacent links, the sets of plates of one link being interlocked with those of the adjacent links.

In testimony whereof I have hereunto set my hand.

FRANK L. MORSE.

Witnesses:
 D. B. PERRY,
 C. C. NICHOLS.

Copies of this patent may be obtained for five cents each, by addressing the "Commissioner of Patents, Washington, D. C."